(12) United States Patent
Mizuno et al.

(10) Patent No.: US 8,295,451 B2
(45) Date of Patent: Oct. 23, 2012

(54) COMMUNICATION APPARATUS

(75) Inventors: Takafumi Mizuno, Obu (JP); Isamu Kitagawa, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 829 days.

(21) Appl. No.: 12/411,161

(22) Filed: Mar. 25, 2009

(65) Prior Publication Data
US 2009/0245488 A1 Oct. 1, 2009

(30) Foreign Application Priority Data

Mar. 28, 2008 (JP) .................. 2008-086920

(51) Int. Cl.
*H04M 11/00* (2006.01)
(52) U.S. Cl. .................. 379/93.09; 379/100.16
(58) Field of Classification Search ............... 379/93.09, 379/35, 100.15, 100.16
See application file for complete search history.

(56) References Cited

U.S. PATENT DOCUMENTS
6,658,247 B1 12/2003 Saito

FOREIGN PATENT DOCUMENTS

| JP | 2000-253453 A | 9/2000 |
|---|---|---|
| JP | 2001-202306 A | 7/2001 |
| JP | 2002-135440 A | 5/2002 |
| JP | 2002-334032 A | 11/2002 |
| JP | 2003-018314 A | 1/2003 |
| JP | 2003-244766 A | 8/2003 |
| JP | 2004-072275 A | 3/2004 |
| JP | 2005-217490 A | 8/2005 |

OTHER PUBLICATIONS

Machine translation of JP 2003244766A.*
Machine translation of JP 2002135440A.*
Japan Patent Office; Notice of Reasons for Rejection in Japanese Patent Application No. 2008-086920 (counterpart to the above-captioned U.S. patent application) mailed Apr. 20, 2010.

* cited by examiner

*Primary Examiner* — Ping Lee
(74) *Attorney, Agent, or Firm* — Baker Botts L.L.P.

(57) ABSTRACT

A communication apparatus includes at least two communication units that are mutually communicable; an incoming call detection device that is configured to detect presence or absence of an incoming call signal; a notification device that is configured to provide a user, when an incoming call signal is detected by the incoming call detection device, with a notification indicating the detection of the incoming call signal; and a first transfer device that is configured to transfer, when a voice communication is started by a first communication unit out of the at least two communication units after the notification by the notification device is provided, a first connection information indicating a connection condition, when the voice communication is started, of a data communication which has been performed by the first communication unit to a second communication unit other than the first communication unit out of the at least two communication units.

18 Claims, 14 Drawing Sheets

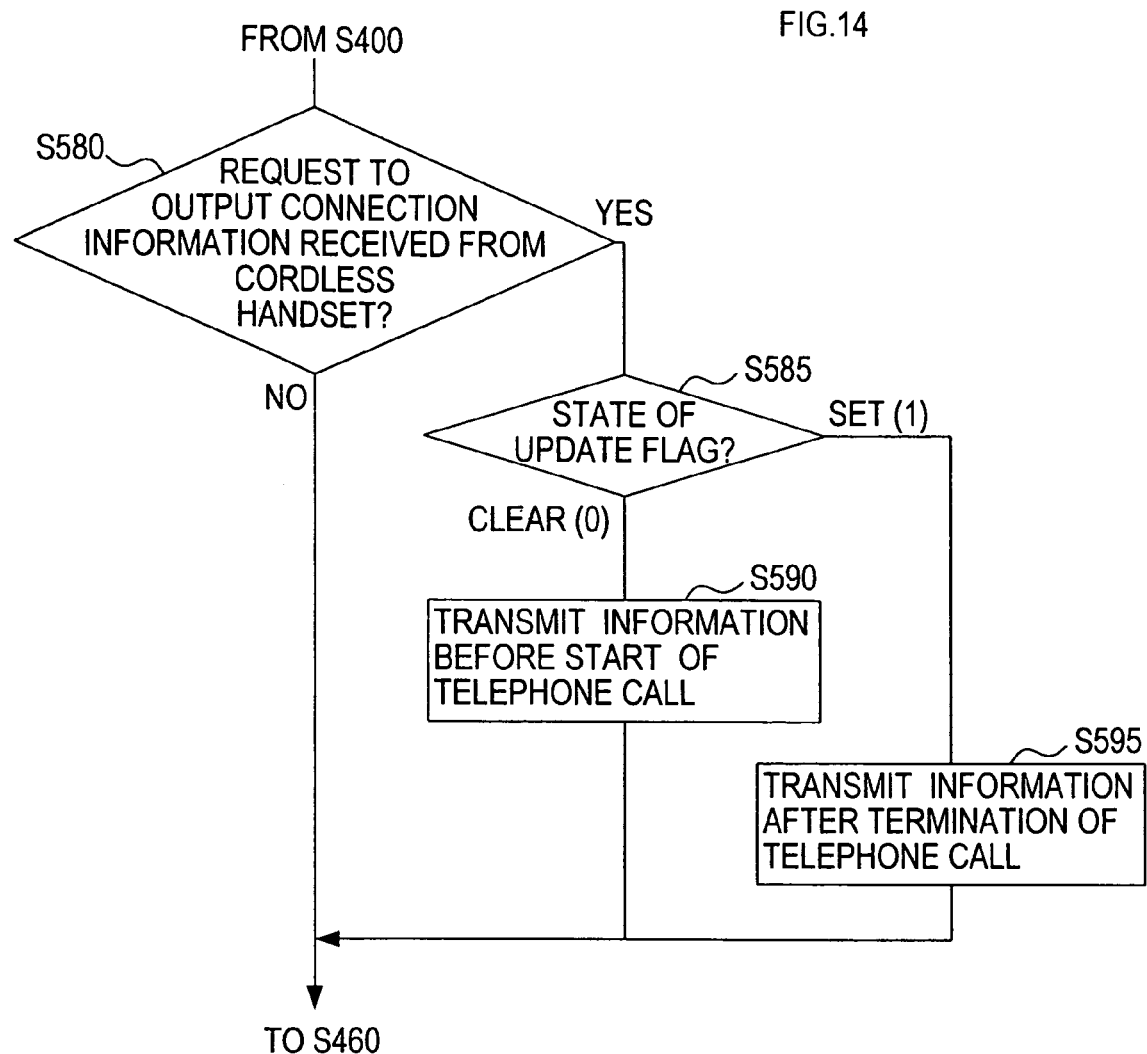

COMMUNICATION APPARATUS

CROSS-REFERENCE TO RELATED APPLICATIONS

This application claims the benefit of Japanese Patent Application No. 2008-86920 filed Mar. 28, 2008 in the Japan Patent Office, the disclosure of which is incorporated herein by reference.

BACKGROUND

This invention relates to a communication apparatus, and is particularly advantageous when applied to a communication apparatus which includes a base unit having a facsimile function and a cordless handset.

For example, in a conventional communication apparatus which includes a base unit and a cordless handset, software (hereinafter referred to as a "browser") for displaying (browsing) information contents by data communication on the Internet or the like is installed in the cordless handset so that information contents (for example, a homepage, and the like) on the Internet is browsable using the cordless handset.

When a power of a battery provided in the cordless handset decreases and browsing of a homepage or the like cannot be continued, it is necessary to stop browsing of a homepage or the like. This involves a problem of inconvenience that once browsing of a homepage or the like is stopped, it is required to browse again from the beginning of the homepage or the like when browsing is restarted.

To overcome the problem, the conventional communication apparatus is configured as below. Specifically, when the power of the battery provided in the cordless handset decreases, the base unit stores connection information indicating a connection condition of data communication performed by the cordless handset until then, and the cordless handset obtains the connection information stored in the base unit when the cordless handset becomes operational. Thus, a browsing state of the homepage or the like can be restored (restarted) by the cordless handset.

Here, the "connection information indicating a connection condition of data communication" means, for example, displayed contents that are currently displayed by the browser, a URL (Uniform Resource Locator) indicating a location of currently browsed information contents, data for maintaining information among a plurality of pages (for example, session information or Cookie information).

SUMMARY

A communication apparatus capable of voice communication and data communication, such as telephone call and facsimile transmission, may receive an incoming call signal during data communication. The incoming call signal here means a signal, which indicates reception of a request for voice communication and causes a telephone to generate a so-called "beep sound".

In this respect, the above described conventional communication apparatus is such that power shortage of the cordless handset causes the base unit to store connection information of data communication performed by the cordless handset until then, and is not prepared for a case of receiving an incoming call signal.

However, reception of an incoming call signal is an unavoidable situation for a communication apparatus which is capable of data communication and voice communication. Accordingly, a function of handling the situation of receiving an incoming call signal during data communication will be greatly advantageous to further improve a usability of the communication apparatus which is capable of data communication and voice communication.

In view of the above, it is desirable to provide a communication apparatus which is capable of data communication and voice communication, and has a further improved usability.

In one aspect of the present invention, a communication apparatus capable of data communication and voice communication includes at least two communication units, an incoming call detection device, a notification device, and a first transfer device. The at least two communication units are mutually communicable. The incoming call detection device is configured to detect presence or absence of an incoming call signal. The notification device is configured to provide a user, when an incoming call signal is detected by the incoming call detection device, with a notification indicating the detection of the incoming call signal. The first transfer device is configured to transfer, when a voice communication is started by a first communication unit out of the at least two communication units after the notification by the notification device is provided, a first connection information indicating a connection condition, when the voice communication is started, of a data communication which has been performed by the first communication unit until the voice communication is started, to a second communication unit other than the first communication unit out of the at least two communication units.

According to the communication apparatus configured as above, when an incoming call signal is detected and a voice communication is started by the first communication unit, the first connection information, when the voice communication is started, on the data communication, which has been performed by the first communication unit until the voice communication is started, is transferred to the second communication unit. It is, therefore, possible to restore and restart the data communication by means of the second communication unit using the transferred first connection information. Thus, a further improved usability of the communication apparatus may be achieved.

BRIEF DESCRIPTION OF THE DRAWINGS

The present invention will now be described below, by way of embodiments, with reference to the accompanying drawings, in which:

FIG. 14 is a flowchart showing a second part of the main task of the base unit in the second embodiment of the present invention.

DETAILED DESCRIPTION OF THE PREFERRED EMBODIMENTS

In embodiments described below, a communication apparatus of the present invention is applied to a facsimile apparatus provided with a base unit and a cordless handset.

Figure 1:
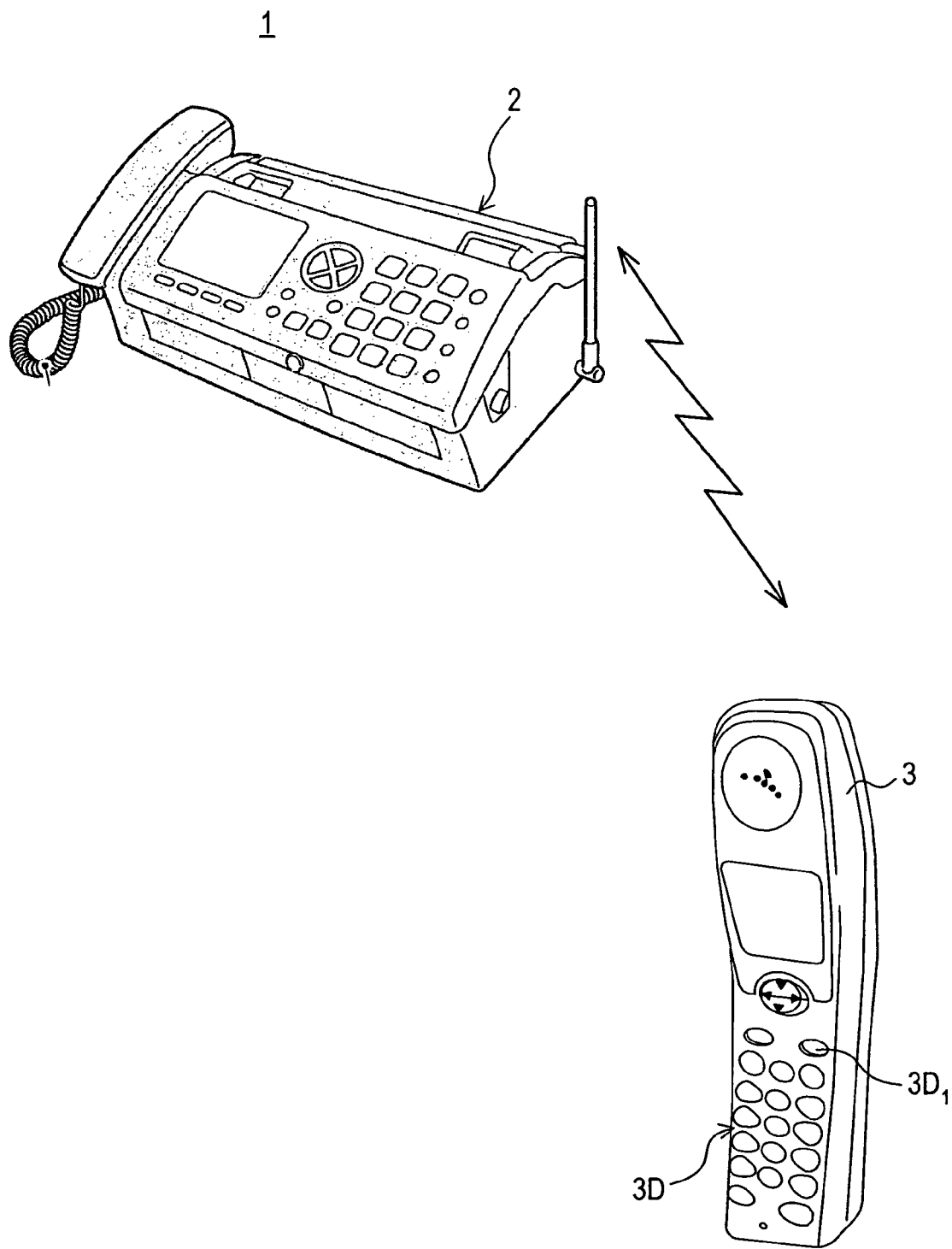
FIG. 1 is a perspective view showing an appearance of a communication apparatus in the embodiments of the present invention.

[First Embodiment]
1. Configuration of Communication Apparatus
1.1. Overview of Communication Apparatus As shown in FIG. 1, a communication apparatus 1 in a first embodiment is provided with a base unit 2 and a cordless handset 3. The base unit 2 and the cordless handset 3 are capable of mutual data communication and voice communication via wireless communication.

Here, data communication means communication for transmitting/receiving digital data, such as the Internet or the like, while voice communication is communication for transmitting/receiving voice signals, such as telephone call, facsimile, or the like.

The base unit 2 is capable of direct data communication and voice communication with another communication apparatus via lines (not shown), such as public lines or dedicated lines. The cordless handset 3 is capable of indirect communication with another communication apparatus via the base unit 2, but is incapable of direct communication with another communication apparatus.

Accordingly, in the communication apparatus 1 in the present embodiment, an incoming call signal for voice communication is received and detected by the base unit 2, but cannot be detected by the cordless handset 3. However, the base unit 2 which has detected an incoming call signal generates a ring tone through a speaker 2H (see FIG. 2) of the base unit 2, and instructs the cordless handset 3 to generate a ring tone through a speaker 3E (see FIG. 3) of the cordless handset 3. Thus, reception of the incoming call signal for voice communication is notified to a user from the base unit 2 and the cordless handset 3.

1.2. Base Unit (see FIG. 2)

Figure 2:
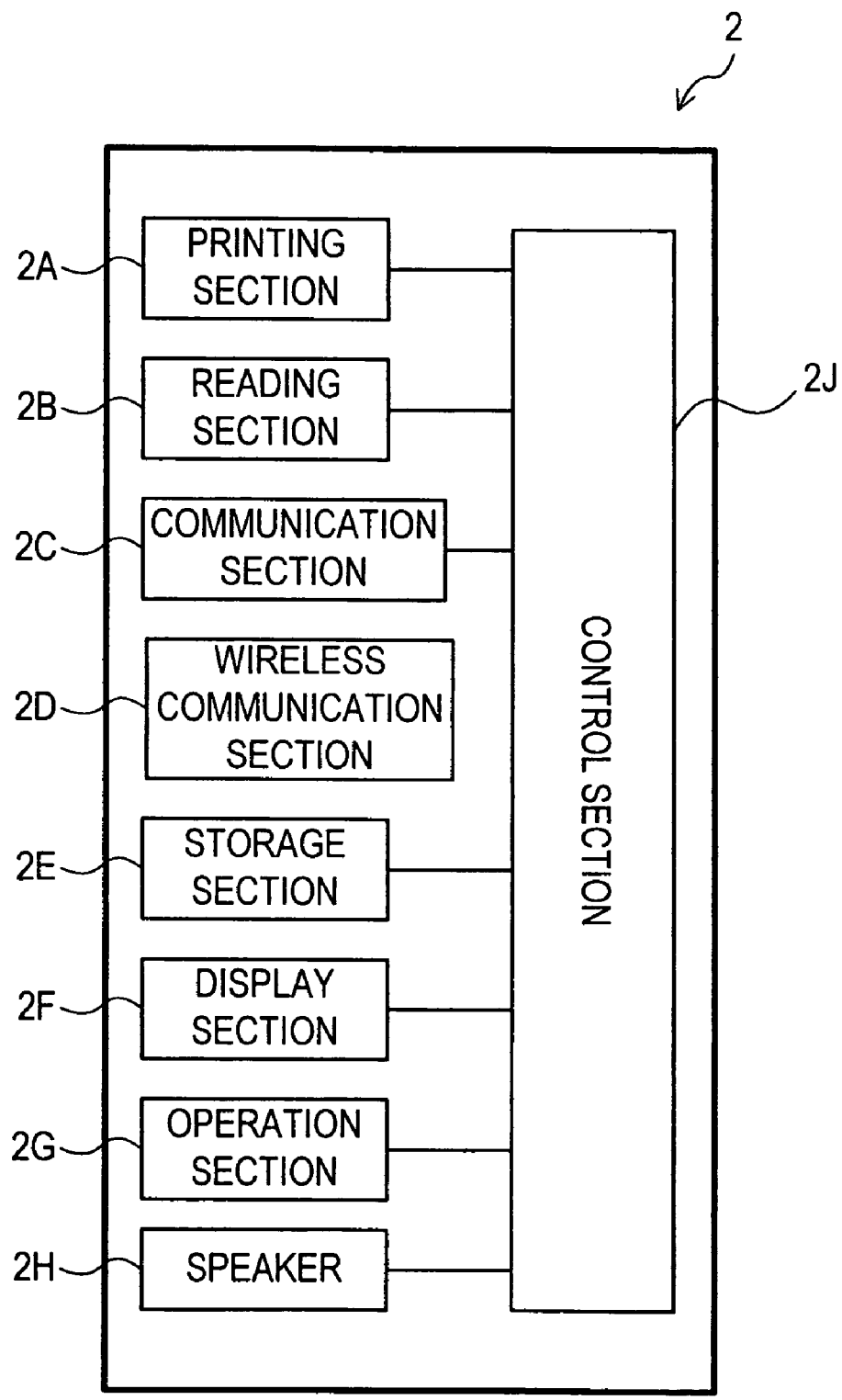
FIG. 2 is an electric block diagram of a base unit in the embodiments of the present invention.

The base unit 2 in the present embodiment has a facsimile function. Specifically, as shown in FIG. 2, the base unit 2 includes a printing section 2A, a reading section 2B, a communication section 2C, a wireless communication section 2D, a storage section 2E, a display section 2F, an operation section 2G, a speaker 2H, and a control section 2J.

The printing section 2A prints received facsimile data, the reading section 2B reads a document and generates facsimile data, and the communication section 2C connects to lines. The base unit 2 is capable of data communication and voice communication with the outside through the communication section 2C.

The wireless communication section 2D wirelessly communicates with the cordless handset 3, the storage section 2E temporarily stores various information and data. The display section 2F displays information to the user, the operation section 2G inputs various command signals to the control section 2J in accordance with an operation by the user, and the speaker 2H reproduces voice data.

Since the display section 2F has a so-called touch panel function in the present embodiment, input by the user may be received through the display section 2F as well as through the operation section 2G.

The printing section 2A and other components are controlled by the control section 2J, which is constituted by a known microcomputer including a CPU, a RAM, a ROM, etc. A program for controlling operation of the base unit 2 is stored in the ROM of the control section 2J, and the control section 2J (the CPU) controls the printing section 2A and other components in accordance with the program stored in the ROM.

1.3. Cordless Handset (see FIG. 3)

Figure 3:
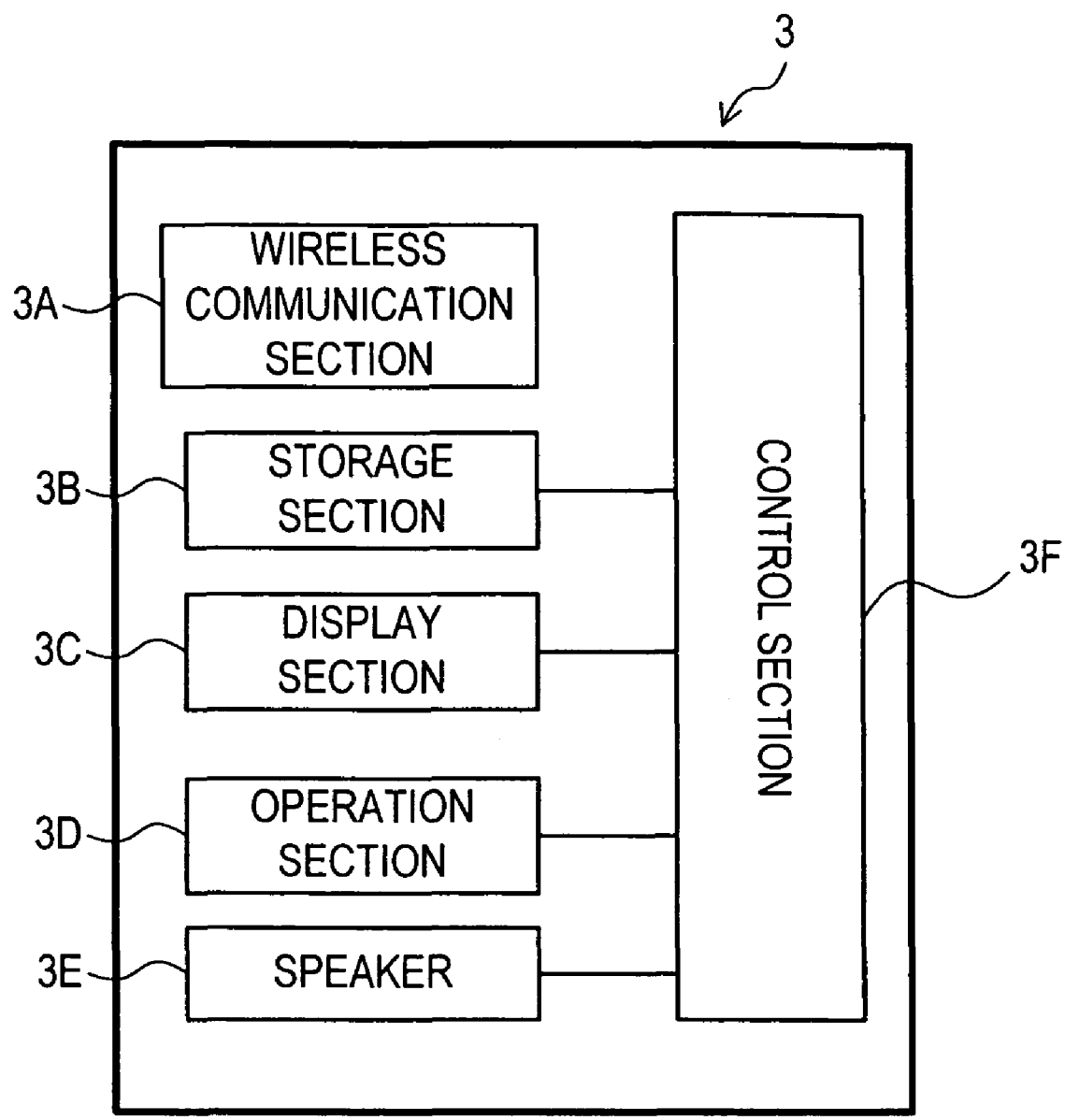
FIG. 3 is an electric block diagram of a cordless handset in the embodiments of the present invention.

As shown in FIG. 3, the cordless handset 3 has substantially the same configuration as the base unit 2. Specifically, the cordless handset 3 includes a wireless communication section 3A, a storage section 3B, a display section 3C, an operation section 3D, a speaker 3E, a control section 3F, and others. The wireless communication section 3A and other components are controlled by the control section 3F.

The control section 3F is constituted by a known microcomputer including a CPU, a RAM, a ROM, etc., as in a case of the control section 2J of the base unit 2. The control section 3F (the CPU) controls the communication section 3A and other components in accordance with a program stored in the ROM.

2. Characteristic Operation of Communication Apparatus
2.1. Overview of Operation (see FIG. 4)

In the communication apparatus 1 in the present first embodiment, each of the base unit 2 and the cordless handset 3 is capable of data communication, such as the Internet or the like, and voice communication, such as telephone call. However, since the cordless handset 3 is connected to a line via wireless communication with the base unit 2, at least the cordless handset 3 is incapable of performing data communication and voice communication at the same time.

Accordingly, when an incoming call signal is detected by the base unit 2 and the detection of the incoming call signal is notified to the cordless handset 3 while the user is performing a data communication by the cordless handset 3, the user is required to terminate the data communication which has been performed until then in order to start voice communication by the cordless handset 3.

In the present first embodiment, when an incoming call signal is detected while a data communication is performed by the cordless handset 3, the detection of the incoming call signal is notified to the user by displaying a notification on the display section 3C as well as contents by the data communication.

When the user is notified and then operates the operation section 3D to start a voice communication by the cordless handset 3, connection information indicating a connection condition, when the voice communication is started, of the data communication which has been performed by the cordless handset 3 until then is transferred to the base unit 2, and transferred information is retained by the base unit 2 (the storage section 2E). By this, the connection condition of the data communication immediately before the voice communication is started by the cordless handset 3 can be restored by the base unit 2.

Here, the "connection information indicating a connection condition of the data communication" means, for example, displayed contents that are currently displayed by the browser, a URL (Uniform Resource Locator) indicating a location of currently browsed information contents, information for maintaining information among a plurality of pages (for example, session information or Cookie information).

Specifically, while a data communication is performed by the cordless handset 3, contents of the data communication are displayed (see a screen G1 in FIG. 4) on the display section 3C of the cordless handset 3 through a browser, and an indication that the base unit 2 is in a standby state is displayed (see a screen G2 in FIG. 4) on the display section 2F of the base unit 2.

In this state, when the base unit 2 detects an incoming call signal, a detection of the incoming call signal and incoming call information as well as the contents of the data communication by the browser are displayed (see a screen G3 in FIG. 4) on the display section 3C of the cordless handset 3. Here, the incoming call information means information indicating a call source of voice communication (a telephone number, information on a caller, etc.).

When the user selects starting of a voice communication by the cordless handset 3, connection information (hereinafter referred to as "information before start of telephone call") indicating a connection condition, when the voice communication is started, of the data communication performed by the cordless handset 3 until then is transferred to the base unit 2 and stored in the storage section 2E of the base unit 2, and is also stored in the storage section 3B of the cordless handset 3.

When the voice communication by the cordless handset 3 is started, an indication that the voice communication is ongoing is displayed on the display section 2F of the base unit 2 and on the display section 3C of the cordless handset 3 (see screens G4 and G5 in FIG. 4), and also an indication (hereinafter referred to as a "Web icon") that information before start of telephone call is stored in the base unit 2 is displayed on the display section 2F of the base unit 2 (see the screen G5 in FIG. 4).

Figure 4:
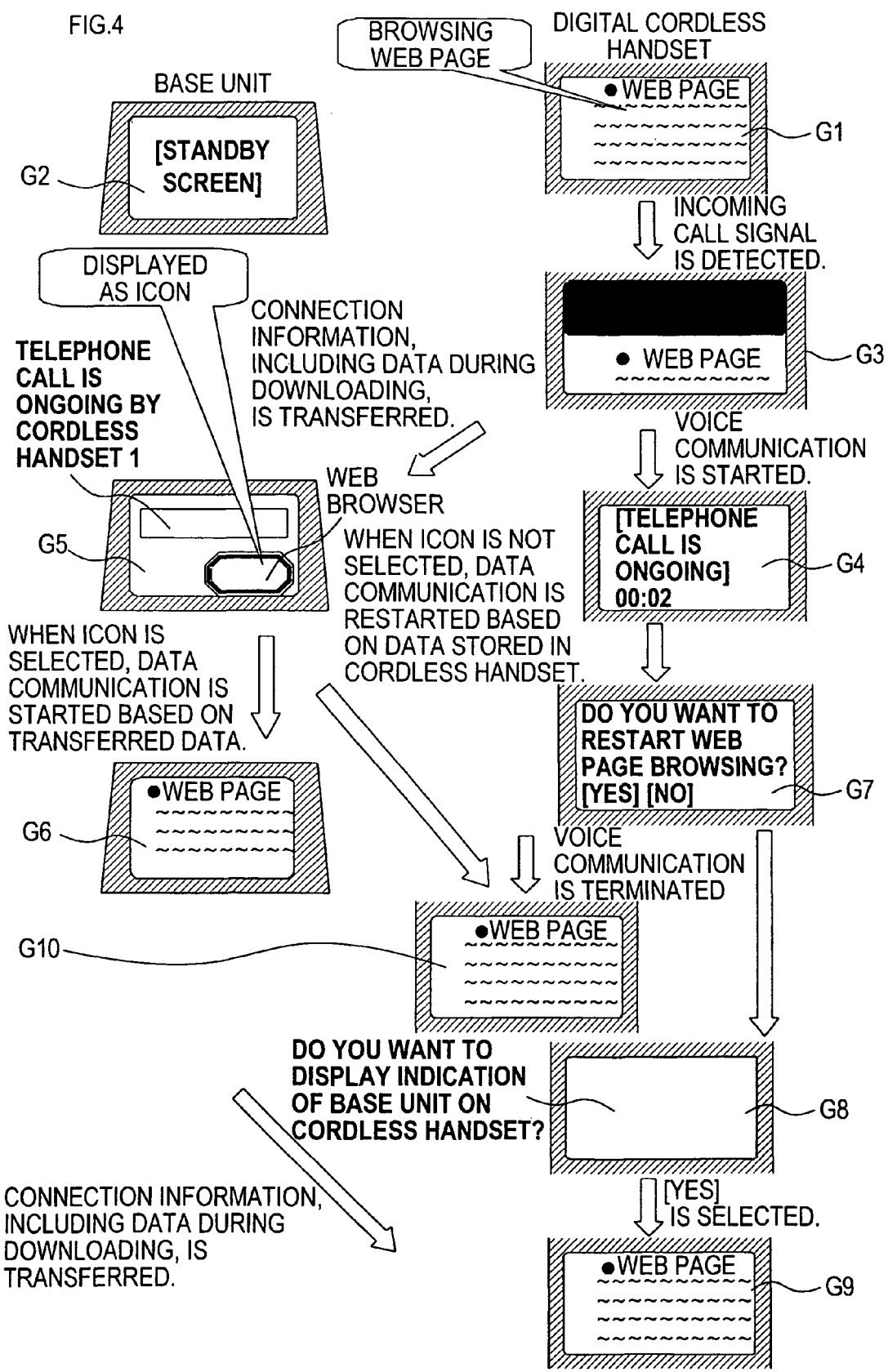
FIG. 4 is an explanatory view showing an operation of a communication apparatus in a first embodiment of the present invention.

In this case, when the user selects the Web icon by, for example, touching the Web icon displayed on the display section 2F, the connection condition when the data communication is terminated by the cordless handset 3 is restored by the base unit 2, and the data communication performed by the cordless handset 3 until then can be continued by the base unit 2 (see a screen G6 in FIG. 4).

On the other hand, when the voice communication by the cordless handset 3 is terminated, a message to ask the user whether or not to restart the data communication, which is terminated as a result of starting the voice communication, is displayed on the display section 3C (see a screen G7 in FIG. 4).

When restart of the data communication by the cordless handset 3 is selected by an operation of the user and also the data communication has been continued even temporarily by the base unit 2 based on the information before start of telephone call, a message is displayed on the display section 3C (see a screen G8 in FIG. 4). The message is to ask the user whether or not to restart the data communication based on the connection information indicating a connection condition, when the voice communication by the cordless handset 3 is terminated or when the data communication by the base unit 2 is terminated, of the data communication which has been performed by the base unit 2 (hereinafter referred to as "information after termination of telephone call").

When restart of the data communication based on the information after termination of telephone call is selected by an operation of the user, the information after termination of telephone call is transferred from the base unit 2 to the cordless handset 3. Then, the connection condition, when the voice communication is terminated, of the data communication which has been performed by the base unit 2 until the voice communication by the cordless handset 3 is terminated, is restored (see a screen G9 in FIG. 4).

On the other hand, when restart of the data communication by the cordless handset 3 is selected by the user and the data communication has not been continued by the base unit 2 based on the information before start of telephone call, the data communication is restored based on the information before start of telephone call stored in the storage section 3B of the cordless handset 3 (see a screen G10 in FIG. 4).

2.2. Details of Operation

The above overview of the operation will be described in detail below based on flowcharts.

2.2.1. Main Task of Cordless Handset (see FIGS. 5 and 6)

A main task of the cordless handset 3 is started when a power switch (not shown) of the cordless handset 3 is turned on, executed by the control section 3F, and terminated when the power switch is turned off. Since the cordless handset 3 is usually used with the power switch kept on, the main task is substantially continuously executed.

Figure 5:
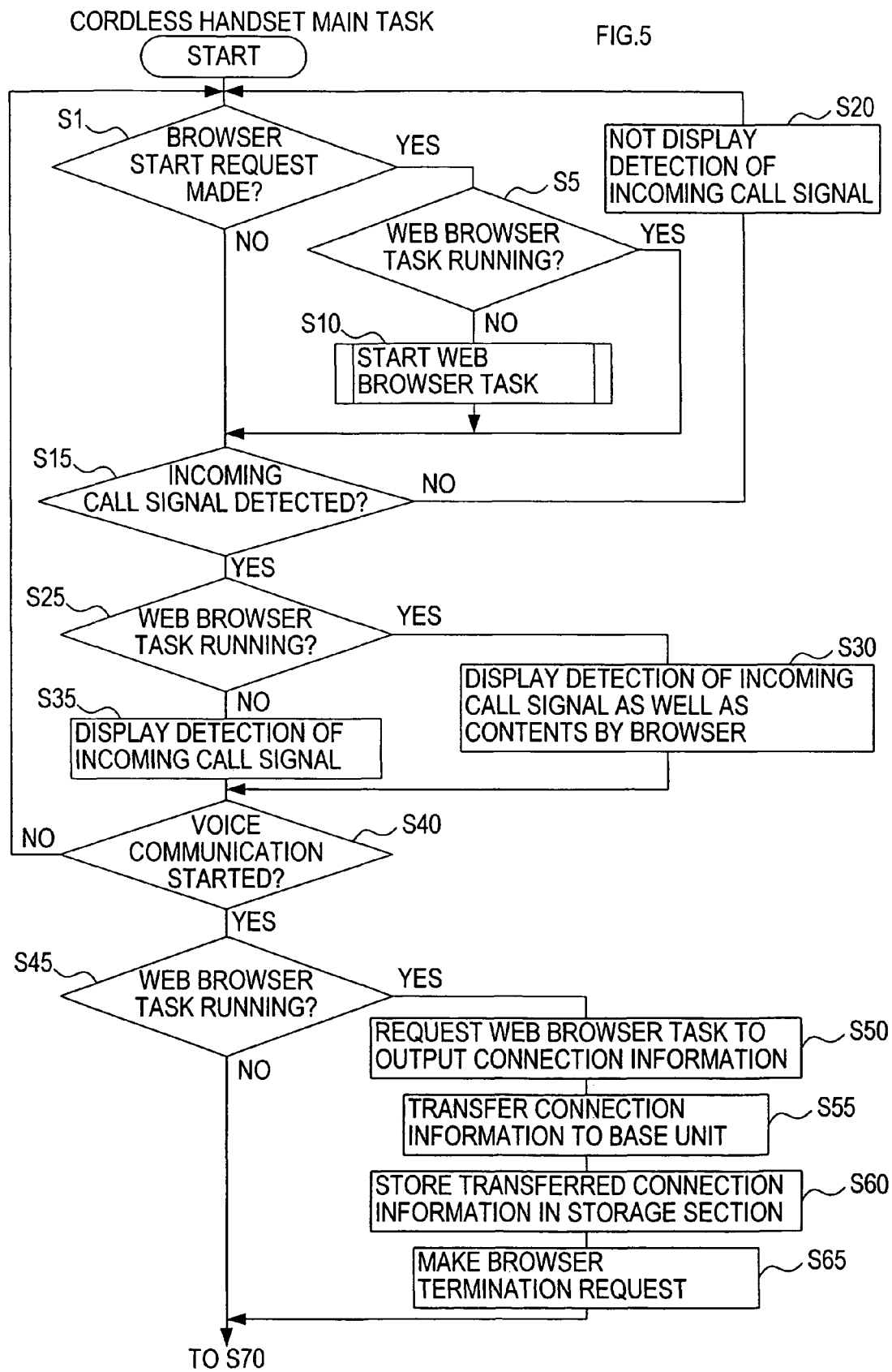
FIG. 5 is a flowchart showing a first part of a main task of a cordless handset in the first embodiment of the present invention.

As shown in FIG. 5, when the main task is started, it is first determined whether or not a browser start request has been made by the user specifically by the user's operation of a browser start button $3D_1$ (see FIG. 1) provided to the operation section 3D, that is, whether or not a data communication start instruction has been made (S1).

When it is determined that a browser start request has been made (S1: YES), it is then determined whether or not a Web browser task (see FIG. 7) is already running (S5). When it is determined that the Web browser task is not running (S5: NO), the Web browser task is started (S10), and then it is determined whether or not a notification of detection of an incoming call signal has been transmitted from the base unit 2 (S15). The details of the Web browser task will be described later.

When it is determined in S1 that a browser start request has not been made (S1: NO) or it is determined that the Web browser task is already running (S5: YES), it is determined whether or not a notification of detection of an incoming call signal has been transmitted from the base unit 2 without starting the Web browser task (S15).

When it is determined that a notification of detection of an incoming call signal has not been transmitted from the base unit 2 (S15: NO), a processing in S1 is executed without displaying a notification of detection of an incoming call signal (S20). On the other hand, when it is determined that a notification of detection of an incoming call signal has been transmitted from the base unit 2 (S15: YES), it is then determined whether or not the Web browser task is running (S25).

When it is determined that the Web browser task is running (S25: YES), a notification of detection of an incoming call signal and incoming call information as well as contents of data communication by the browser is displayed on the display section 3C of the cordless handset 3 (S30), and then it is determined whether or not start of voice communication through the cordless handset 3 has been selected by the user (S40).

On the other hand, when it is determined that the Web browser task is not running (S25: NO), only a notification of detection of an incoming call signal and incoming call information is displayed on the display section 3C of the cordless handset 3 (S35), and then it is determined whether or not start of a voice communication through the cordless handset 3 has been selected by the user (S40).

When it is determined that start of a voice communication has not been selected (S40: NO), the processing in S1 is executed. On the other hand, when it is determined that start of a voice communication through the cordless handset 3 has been selected (S40: YES), it is determined again whether or not the Web browser task is running (S45).

Figure 6:
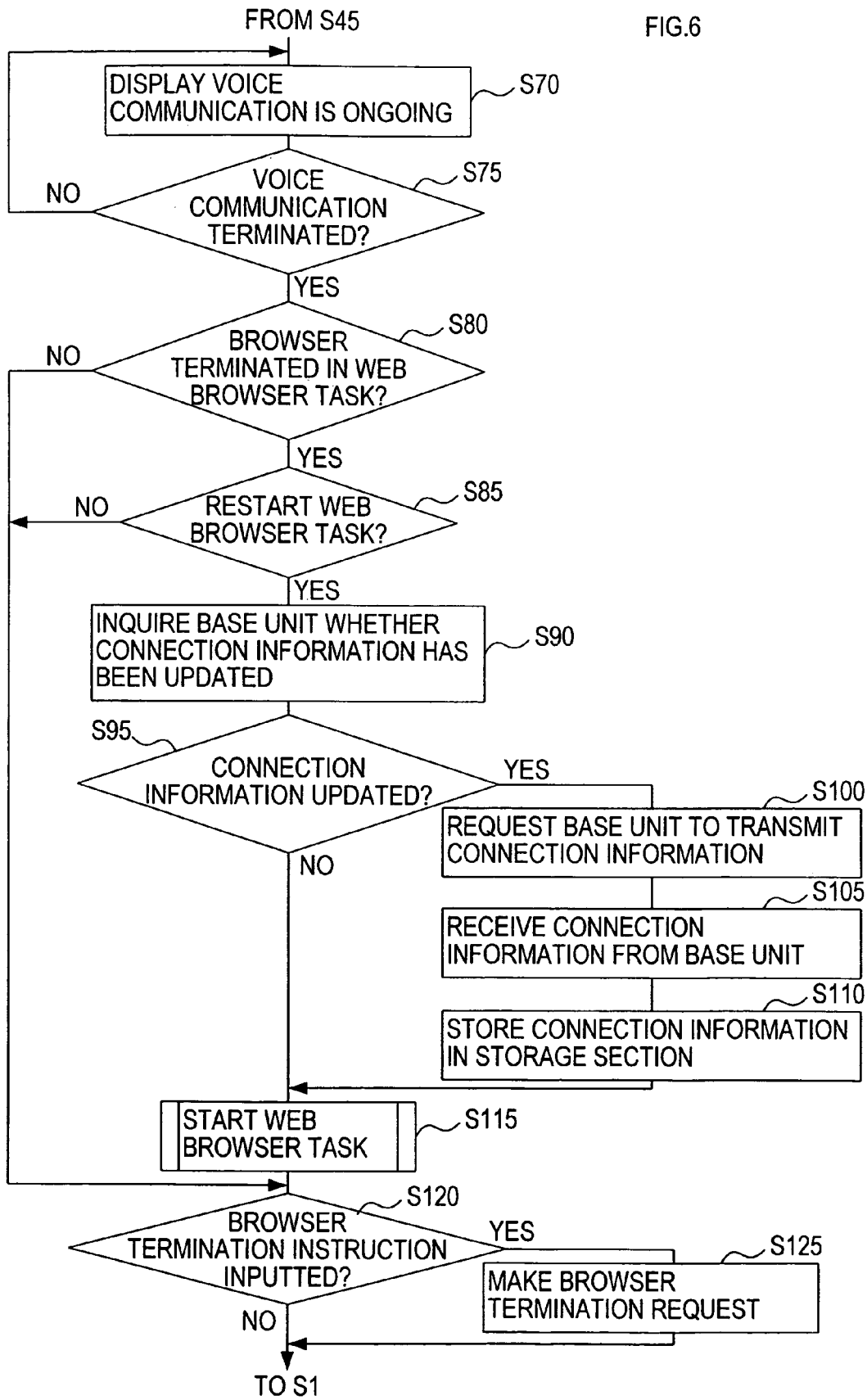
FIG. 6 is a flowchart showing a second part of the main task of the cordless handset in the first embodiment of the present invention.

When it is determined that the Web browser task is not running (S45: NO), an indication that a voice communication is ongoing is displayed on the display section 3C (S70), as shown in FIG. 6. On the other hand, when it is determined that the Web browser task is running (S45: YES), a request to output current connection information (i.e., information before start of telephone call) is made to the running Web browser task (S50).

When the information before start of telephone call is outputted from the Web browser task, the information before start of telephone call is transferred to the base unit 2 (S55), and the same information before start of telephone call is also stored in the storage section 3B of the cordless handset 3 (S60).

Subsequently, a request to terminate the currently running browser (hereinafter referred to as a "termination request") is made to the Web browser task, and a termination management flag indicating that a termination request has been made is set in a specified area of the storage section 3B (S65), and a processing in S70 is executed.

The termination management flag is to distinguish between a termination request made in S65 following a response in S40 to an incoming call through the cordless handset 3 while the browser is running and a termination request through another method, for example, a termination request made based on a specific operation by the user through the operation section 3D.

It is to be noted that a processing to terminate the browser executed in response to a termination request is not executed in the present task. The termination request is recognized in S240 (see FIG. 7) of the Web browser task, and the processing to terminate the browser is executed in the Web browser task.

Subsequently, as shown in FIG. 6, it is determined whether or not the voice communication has been terminated (S75). When it is determined that the voice communication has not been terminated (S75: NO), the indication that a voice communication is ongoing is continued to be displayed (S70). When it is determined that the voice communication has been terminated (S75: YES), it is determined whether or not the browser has been terminated in the Web browser task (S80), and then the termination management flag is reset (cleared).

In S80, it is determined whether or not the browser is terminated in S240 of the Web browser task based on a state of the termination management flag. Specifically, if the termination management flag is set, it means that the browser is terminated by responding to an incoming call through the cordless handset 3 and starting the voice communication, and thus it is determined that the browser has been terminated in the Web browser task. On the contrary, if the termination management flag is not set (i.e., cleared), it is determined that the browser has not been terminated in the Web browser task.

When it is determined in S80 that the browser has not been terminated in the Web browser task, that is, when the termination management flag is cleared (S80: NO), the processing in S1 is executed. This applies to a case, for example, where the browser is not running when an incoming call is responded through the cordless handset 3, and a telephone call with a caller is started by the cordless handset 3 and is thereafter terminated.

When it is determined that the browser has been terminated in the Web browser task (S80: YES), it is determined whether or not to restart the data communication, which has been terminated as a result of starting the voice communication, through the cordless handset 3 based on the user's instruction (S85).

When it is determined that the data communication is not to be restarted through the cordless handset 3 (S85: NO), the processing S1 is executed. When it is determined that the data communication is to be restarted through the cordless handset 3 (S85: YES), an inquiry is made to the base unit 2 as to whether or not the connection information has been updated by the data communication continued by the base unit 2 based on the information before start of telephone call (S90).

Subsequently, it is determined whether or not the connection information has been updated (S95) based on a result of the inquiry to the base unit 2 in S90. When it is determined that the connection information has not been updated (S95: NO), the Web browser task is started (S115), and then it is determined whether or not a browser termination instruction has been inputted by a user's operation of a browser termination button (not shown) provided to the operation section 3D (S120). When it is determined that a browser termination instruction has been inputted (S120: YES), a browser termination request is made (S125), and then the processing in S1 is executed. When it is determined that a browser termination instruction has not been inputted (S120: NO), the processing in S1 is executed.

On the other hand, when it is determined that the connection information has been updated (S95: YES), a request to transmit the information after termination of telephone call to the cordless handset 3 is made to the base unit 2 (S10), the information after termination of telephone call is received (S105), the received information after termination of telephone call is stored in the storage section 3B (S110), and the Web browser task is started (S115).

Figure 7:
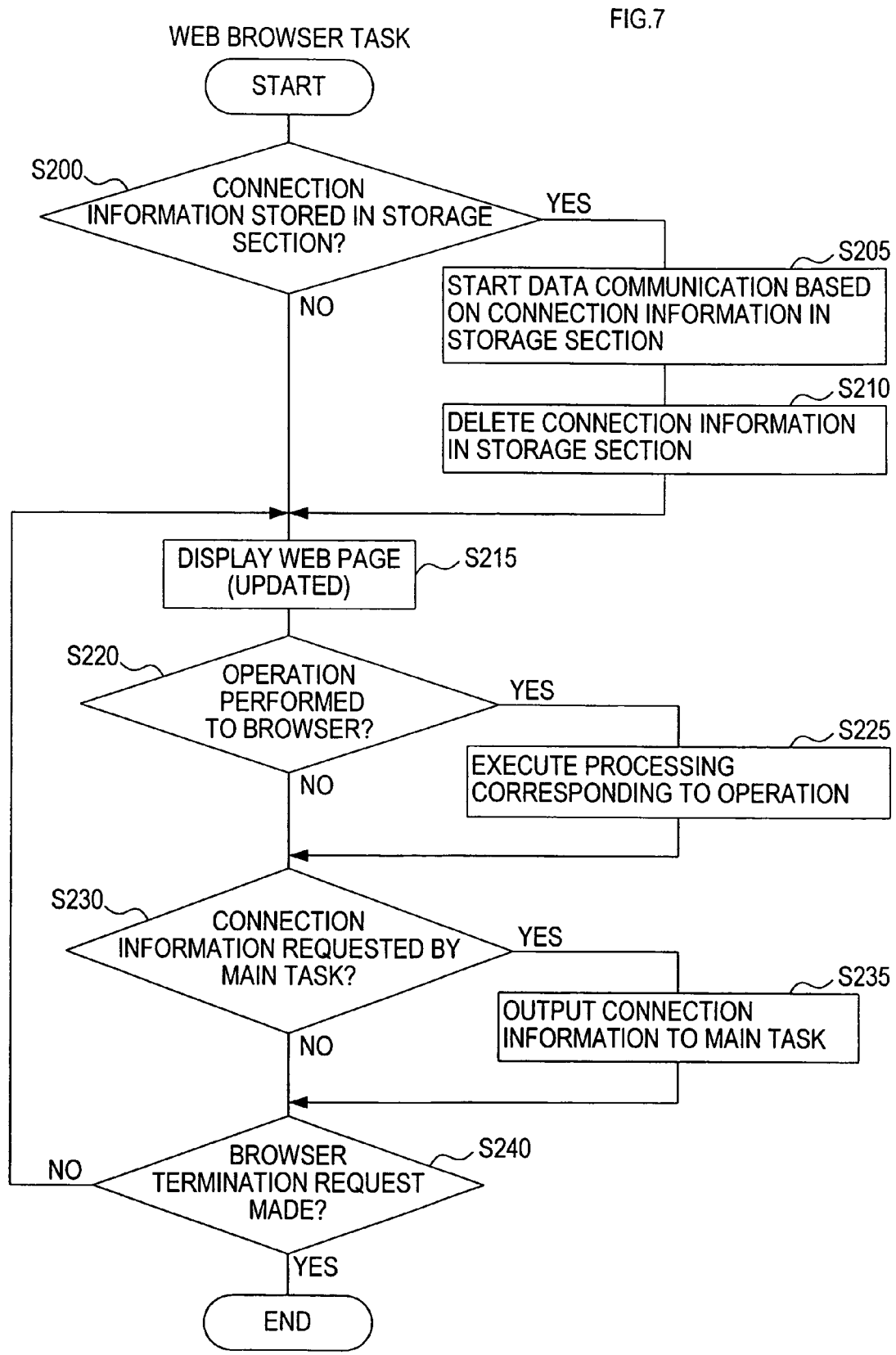
FIG. 7 is a flowchart showing a Web browser task in the embodiments of the present invention.

2.2.2 Web Browser Task (see FIG. 7)

When the browser start button $3D_1$ (see FIG. 1) is operated by the user, the Web browser task is started and is executed by the control unit 3F of the cordless handset 3. It is first determined whether or not information before start of telephone call or information after termination of telephone call is stored in the storage section 3B of the cordless handset 3 (S200). When it is determined that either connection information is not stored (S200: NO), a default URL (a homepage) set for the browser is displayed (S215).

On the other hand, when it is determined that one of the connection information is stored (S200: YES), a connection condition is restored (S205) based on the stored connection information. When restoration is finished, the connection information stored in the storage section 3B is deleted (S210), and contents of the data communication are displayed in accordance with the restored connection information (S215).

The connection information stored in the storage section 3B of the cordless handset 3 is the connection information stored in S110, that is, the information after termination of telephone call transmitted from the base unit 2, or the information before start of telephone call stored in S60.

Accordingly, when the information before start of telephone call is stored in the storage section 3B as the connection information, the connection condition, when the voice communication is started, of the data communication which has been performed until the voice communication is started is restored, while when the information after termination of telephone call is stored in the storage section 3B as the connection information, the connection condition, when the voice communication by the cordless handset 3 is terminated or the data communication by the base unit 2 is terminated, of the data communication which is performed by the base unit 2 before or when the voice communication is terminated is restored.

When contents of the data communication are displayed (S215), it is determined whether or not an operation by the user is performed to the browser (S220). When it is determined that an operation is performed (S220: YES), a processing corresponding to the operation is executed (S225), while when it is determined that an operation is not performed (S220: NO), it is then determined whether or not a request to output current connection information (S50) has been made from the main task of the cordless handset 3 (S230).

When it is determined that a request to output current connection information has been made from the main task of the cordless handset 3 (S230: YES), the current connection information is outputted (S235). Then, it is determined whether or not a browser termination request (S65) has been made from the main task of the cordless handset 3 (S240).

When it is determined that a browser termination request has been made (S240: YES), the browser is terminated and then the Web browser task is terminated. On the other hand, when it is determined that a browser termination request has not been made (S240: NO), the task returns to S215.

The cordless handset 3 in the present embodiment is not provided with a communication section for directly communicating with public lines. Accordingly, when the Web browser task is started and an operation to the browser is performed, a signal corresponding to the operation is outputted to the lines through the communication section 2C of the base unit 2, and meanwhile, when an answer signal (for example, browse data of a homepage) is received from the lines, the answer signal is transferred from the base unit 2 to the cordless handset 3 and is displayed on the display section 3C of the cordless handset 3.

2.2.3 Main Task of Base Unit (see FIGS. 8-11)

A main task of the base unit 2 is started when a power switch (not shown) of the base unit 2 is turned on, executed by the control section 2J of the base unit 2, and terminated when the power switch is turned off. Since the base unit 2 is also usually used with the power switch kept on, the main task is substantially continuously executed.

Figure 8:
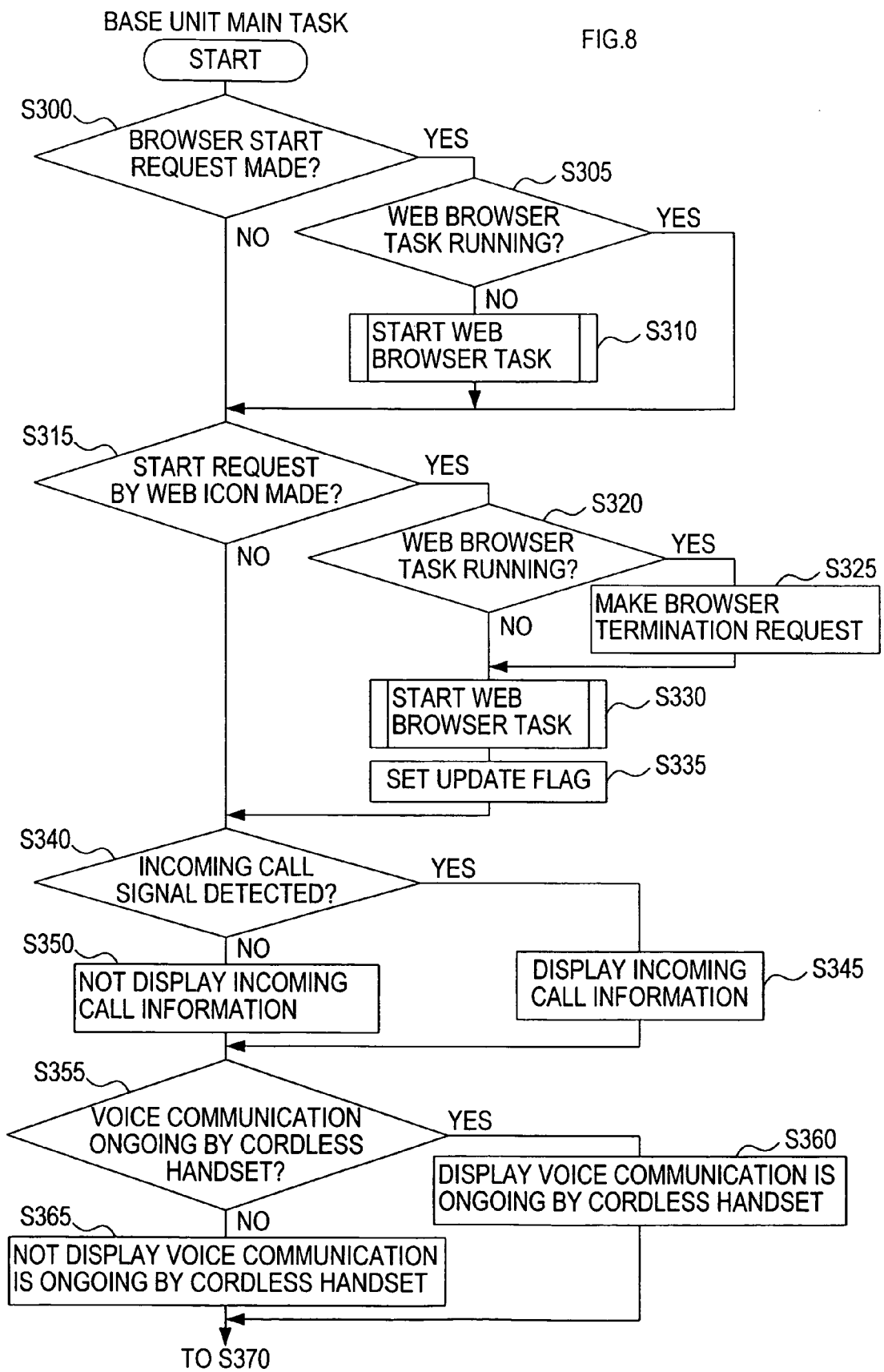
FIG. 8 is a flowchart showing a first part of a main task of a base unit in the first embodiment of the present invention.

As shown in FIG. 8, when the main task is started, it is first determined whether or not a browser start request has been made by the user specifically by the user's operation of a browser start button (not shown) provided to the operation section 2G, that is, whether or not a data communication start instruction has been made by the user (S300).

When it is determined that a browser start request has been made (S300: YES), it is then determined whether or not a Web browser task is already running (S305). When it is determined that the Web browser task is not running (S305: NO), the Web browser task is started (S310), and then it is determined whether or not a start request of data communication (i.e., a browser start request) has been made by a Web icon (S315).

Since the Web browser task is the same as the Web browser task executed by the control section 3F of the cordless handset 3, no detailed description is given here. In the base unit 2, the Web browser task is executed by the control section 2J. The storage section referred to in the processings in S200 and S205 of the Web browser task in the base unit 2 is an information storage area set in the storage unit 2E (see FIG. 11).

When it is determined in S300 that a browser start request has not been made (S300: NO) or it is determined that the Web browser task is already running (S305: YES), it is determined whether or not a start request of data communication has been made by a Web icon (S315).

When it is determined that a start request has been made (S315: YES), it is then determined whether or not the Web browser task is running (S320), while when it is determined that a start request of data communication has not been made by the Web icon (S315: NO), it is then determined whether or not an incoming call signal has been detected (S340).

When it is determined that the Web browser task is running (S320: YES), a browser termination request is made (S325), and then the Web browser task is started (S330). On the other hand, when it is determined that the Web browser task is not running (S320: NO), the Web browser task is started (S330). Then, an update flag is set in the storage section 2E of the base unit 2 (S335), and a processing in S340 is executed.

The update flag is for determining whether or not the connection information has been updated by a browser start request being made by the Web icon and the data communication being restored in the base unit 2 based on the information before start of telephone call.

Accordingly, when the update flag is set in the storage section 2E, it means that the connection information has been updated, while when the update flag is not set in the storage section 2E, it means that the connection information has not been updated.

Subsequently, when it is determined in S340 that an incoming call signal has been detected (S340: YES), incoming call information is displayed on the display section 2F of the base unit 2, while when it is determined in S340 that an incoming call signal has not been detected (S340: NO), incoming call information is not displayed (S350). Then, it is determined whether or not a voice communication is ongoing by the cordless handset 3 (S355).

Figure 9:
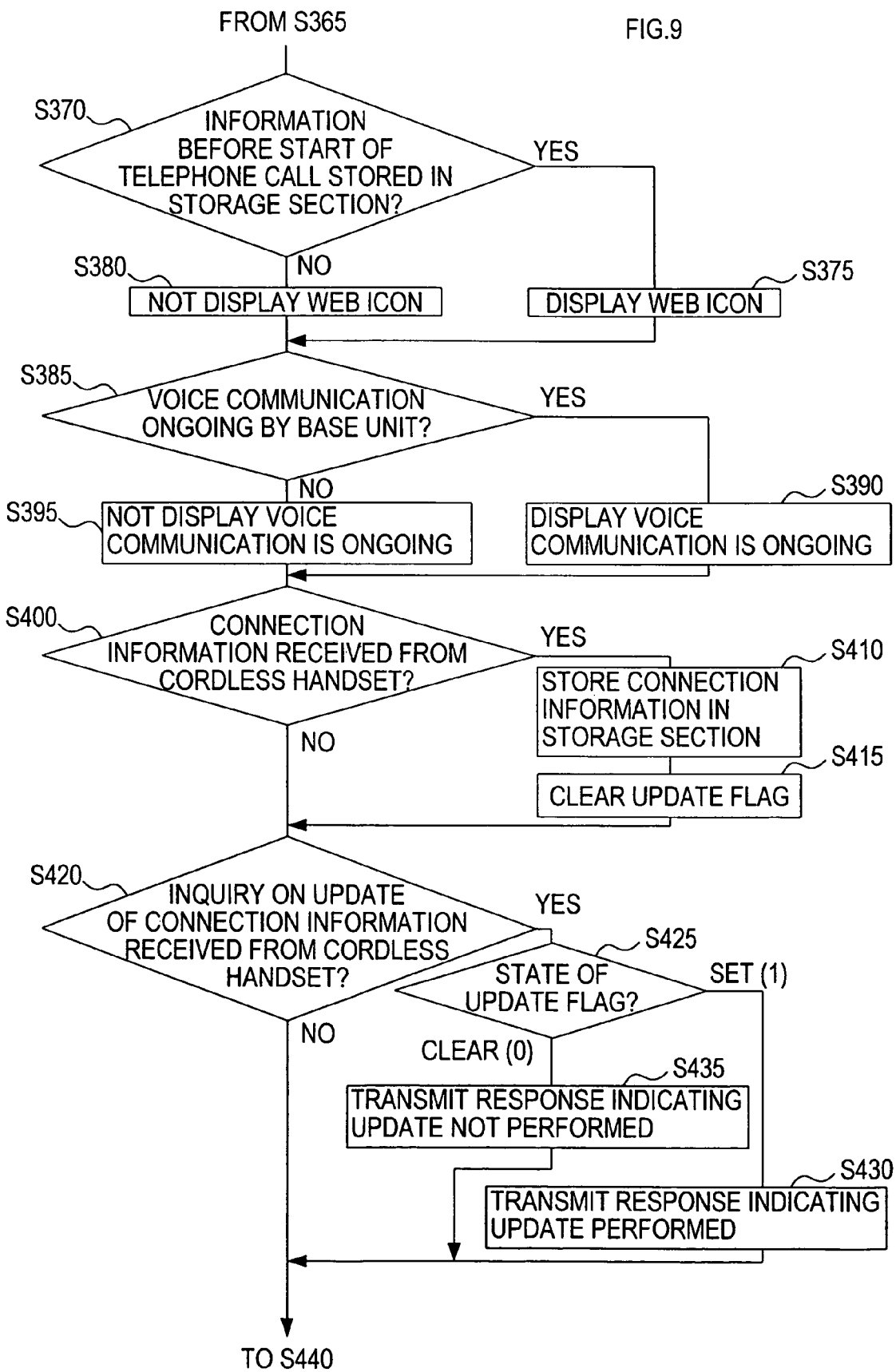
FIG. 9 is a flowchart showing a second part of the main task of the base unit in the first embodiment of the present invention.

When it is determined that a voice communication is ongoing by the cordless handset 3 (S355: YES), an indication that a voice communication is ongoing by the cordless handset 3 is displayed on the display section 2F (S360). Then, as shown in FIG. 9, it is determined whether or not the information before start of telephone call is stored in the storage section 2F of the base unit 2 (S370). On the other hand, when it is determined that a voice communication is not ongoing by the cordless handset 3 (S355: NO), an indication that a voice communication is ongoing by the cordless handset 3 is not displayed on the display section 2F (S365) as shown in FIG. 8, and then a processing in S370 is executed.

Figure 11:
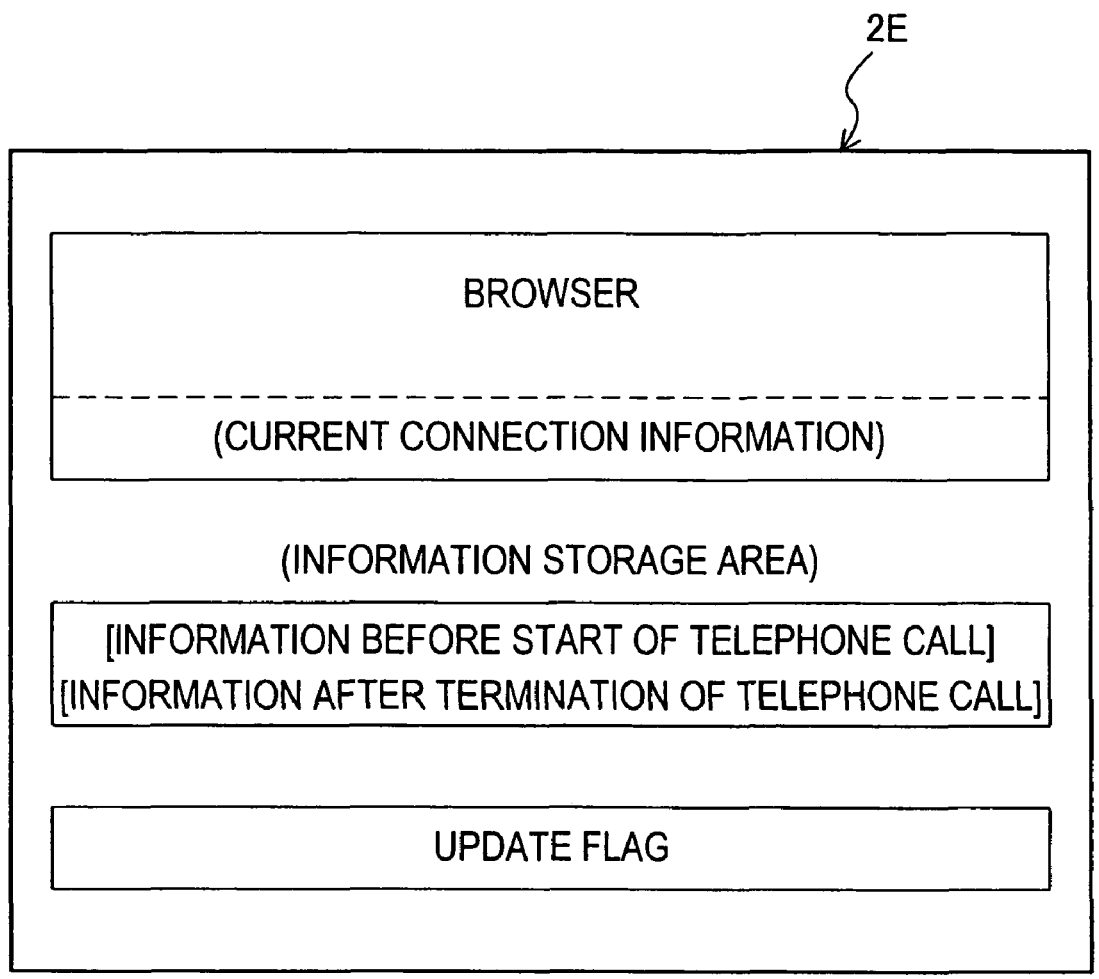
FIG. 11 is a conceptual view of a storage section of the base unit in the first embodiment of the present invention.

As shown in FIG. 11, the storage section 2E of the base unit 2 includes an area for storing an update flag, an information storage area for storing information before start of telephone call or information after termination of telephone call, and an area for storing connection information by a currently executed browser. Accordingly, it is determined whether or not the information before start of telephone call is stored in the storage section 2E based on whether or not the information before start of telephone call is stored in the information storage area.

Subsequently, as shown in FIG. 9, when it is determined that the information before start of telephone call is stored (S370: YES), the Web icon is displayed on the display section 2F (S375), and then it is determined whether or not a voice communication is ongoing by the base unit 2 itself (S385). On the other hand, when it is determined that the information before start of telephone call is not stored (S370: NO), the Web icon is not displayed on the display section 2F (S380), and then it is determined whether or not a voice communication is ongoing by the base unit 2 itself (S385).

Specifically, for example, when a start request has been made by the Web icon in S315 while the information before start of telephone call is already stored and the Web icon is displayed on the display section 2F, the Web browser task is started in S330, and thereby the connection information is deleted in S210 in FIG. 7.

Accordingly, the information before start of telephone call stored in the information storage area is deleted in S330. Then, even when a processing in S370 is executed again while the telephone call by the cordless handset 3 is continued, the Web icon is not displayed again since the information before start of telephone call is not stored in the information storage area.

When it is determined that a voice communication is ongoing (S385: YES), an indication of the ongoing voice communication is displayed on the display section 2F (S390), while when it is determined that a voice communication is not ongoing (S385: NO), an indication of ongoing voice communication is not displayed (S395). Then, it is determined whether or not the information before start of telephone call is transmitted from the cordless handset 3 (S400).

When it is determined that information before start of telephone call is not transmitted from the cordless handset 3 (S400: NO), it is then determined whether or not an inquiry (S90) from the cordless handset 3 is received on whether or not the data communication is continued by the base unit 2 based on the information before start of telephone call and the connection information is updated (S420).

On the other hand, when it is determined that the information before start of telephone call is received from the cordless handset 3 (S400: YES), the received information before start of telephone call is stored (S410), the update flag is deleted (cleared) (S415), and a processing in S420 is executed.

Figure 10:
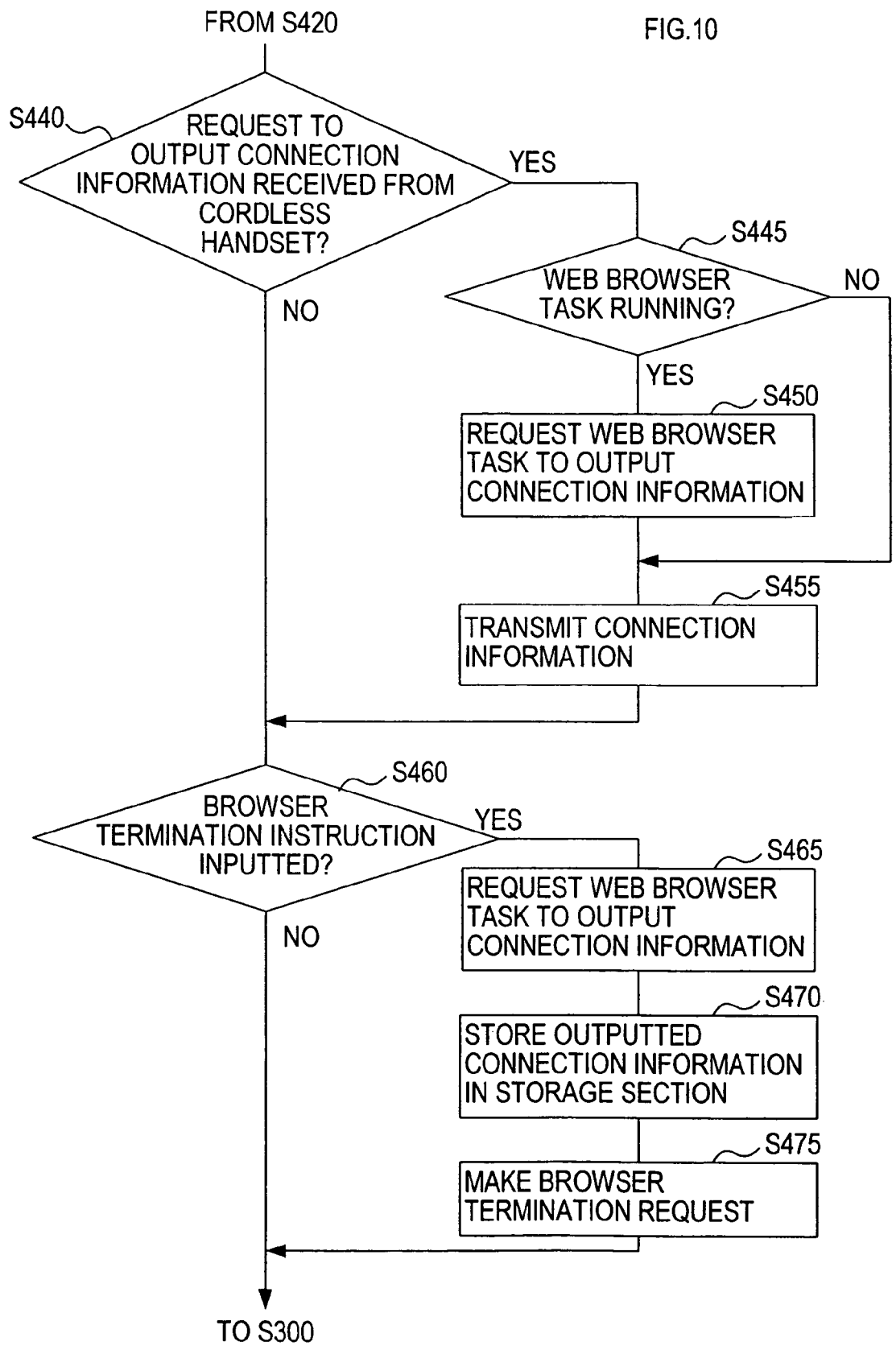
FIG. 10 a flowchart showing a third part of the main task of the base unit in the first embodiment of the present invention.

When it is determined in S420 that an inquiry (S90) from the cordless handset 3 is not received (S420: NO), it is then determined whether or not a request to output the information after termination of telephone call from the cordless handset 3 is received (S440) as shown in FIG. 10. On the other hand, when it is determined that an inquiry from the cordless handset 3 is received (S420: YES), a state of the update flag is determined (S425).

When it is determined that the update flag is set (S425: Set (1)), a response indicating an update being performed is transmitted to the cordless handset 3 (S430), while when it is determined that the update flag is not set (S425: Clear (0)), a response indicating an update not being performed is transmitted to the cordless handset 3, and the information before start of telephone call stored in the information storage area is deleted (S435), and then a processing in S440 is executed.

The reason for deleting the information before start of telephone call in S435 is as follows: In a case where it is determined that an update flag is not set, that is, the connection information is not updated by the base unit 2, the information before start of telephone call transferred from the cordless handset 3 will not be used. Accordingly, in the present embodiment, when a response indicating an update not being executed is transmitted to the cordless handset 3, the information before start of telephone call is deleted in order to prevent the Web icon from being displayed again when the task is started from the processing in S300 again and proceeds up to the processing in S370.

As shown in FIG. 10, when it is determined in S 440 that a request to output the information after termination of telephone call from the cordless handset 3 is received (S440: YES), it is then determined whether or not the Web browser task is running (S445).

When it is determined that the Web browser task is not running (S445: NO), the information after termination of telephone call stored in the storage section 2E (to be stored in a later-described processing in S470) is transmitted to the cordless handset 3, and the information after termination of telephone call is deleted from the information storage area (S455). When it is determined that the Web browser task is running (S445: YES), a request to output the connection information is made to the Web browser task (S450). Then, the information after termination of telephone call outputted from the Web browser task, that is, the current connection information (the information after termination of telephone call) is transmitted to the cordless handset 3 (S455).

On the other hand, when it is determined that a request to output the information after termination of telephone call is not received (S440: NO), the connection information is not transmitted to the cordless handset 3, and a processing in S460 is executed.

Subsequently, it is determined in S460 whether or not a browser termination instruction has been inputted from the user by the user's operation of the browser termination button (not shown) provided to the operation section 2G. When it is determined in S460 that a browser termination instruction has been inputted (S460: YES), a request to output the connection information is made to the Web browser task (S465). Then, the connection information outputted from the Web browser task, that is, the current connection information indicating the connection condition immediately before the browser is terminated (the information after termination of telephone call) is stored in the information storage area of the storage section 2E (S470). Then, a browser termination request is made to the Web browser task (S475), and the processing in S300 is executed.

On the other hand, when it is determined that a browser termination instruction has not been inputted (S460: NO), the processing in S300 is executed.

3. Features of Communication Apparatus in Present Embodiment

According to the present embodiment, when an incoming call signal is detected, the connection information (i.e., the information before start of telephone call) regarding the data communication performed by the cordless handset 3 until then is transferred to the base unit 2. This allows the base unit 2 to restore and restart the data communication using the transferred information before start of telephone call, which may achieve a higher usability of the communication apparatus 1.

Also, in the present embodiment, when an incoming call signal is detected, a notification of detection of the incoming call signal is displayed on the display section 3C as well as contents by the data communication. Accordingly, it is possible to notify the user of reception of an incoming call without stopping the data communication.

In addition, it is possible to prevent the user from misunderstanding that the data communication has been stopped due to the incoming call since the contents by the data communication are continued to be displayed.

Further, in the present embodiment, the base unit 2 is capable of restoring the connection condition by the cordless handset 3 based on the information before start of telephone call transferred from the cordless handset 3 and starting the data communication. Accordingly, it is possible to continue the data communication by the base unit 2 while performing a voice communication by the cordless handset 3.

Also, in the present embodiment, the base unit 2 starts the data communication based on the information before start of telephone call only when the base unit 2 receives a user's instruction. Accordingly, it is possible to prevent an unintended start (continuation) of the data communication.

Moreover, in the present embodiment, when it is determined that the data communication has not been continued, that is, it is determined that the information before start of telephone call and the information after termination of telephone call are identical, the data communication is restored based on the connection information stored by the cordless handset 3 (the information before start of telephone call). Accordingly, it is possible to restart the data communication immediately after the voice communication by the cordless handset 3 is terminated.

Also, in the present embodiment, when it is determined that the data communication has been continued, that is, it is determined that the information before start of telephone call and the information after termination of telephone call are not identical, the information after termination of telephone call is transmitted to the cordless handset 3. Accordingly, even when the data communication is performed and the connection information is updated by the base unit 2 while the voice communication is performed by the cordless handset 3, it is possible to restart the data communication by the cordless handset 3 based on the updated connection information.

Further, in the present embodiment, the information after termination of telephone call is transmitted from the base unit 2 to the cordless handset 3 when a user's instruction is provided. Accordingly, it is possible to restore the data communication in accordance with the user's intention, which may achieve a further higher usability of the communication apparatus 1.

[Second Embodiment]

In the first embodiment, when the data communication is continued and the connection information is updated by the base unit 2, the cordless handset 3 receives the information after termination of telephone call from the base unit 2 and restores the data communication, while when the connection information is not updated by the base unit 2, the cordless handset 3 restores the data communication based on the information before start of telephone call stored in the cordless handset 3.

Unlike the above, in the second embodiment, the base unit 2 determines whether or not the connection information is updated. When the connection information is updated, the base unit 2 transmits the information after termination of telephone call to the cordless handset 3. When the connection information is not updated, the base unit 2 transmits the information before start of telephone call as it is, which has been previously obtained from the cordless handset 3, to the cordless handset 3, and then the cordless handset 3 restores the data communication based on the connection information transmitted from the base unit 2.

1. Main Task of Cordless Handset

Figure 12:
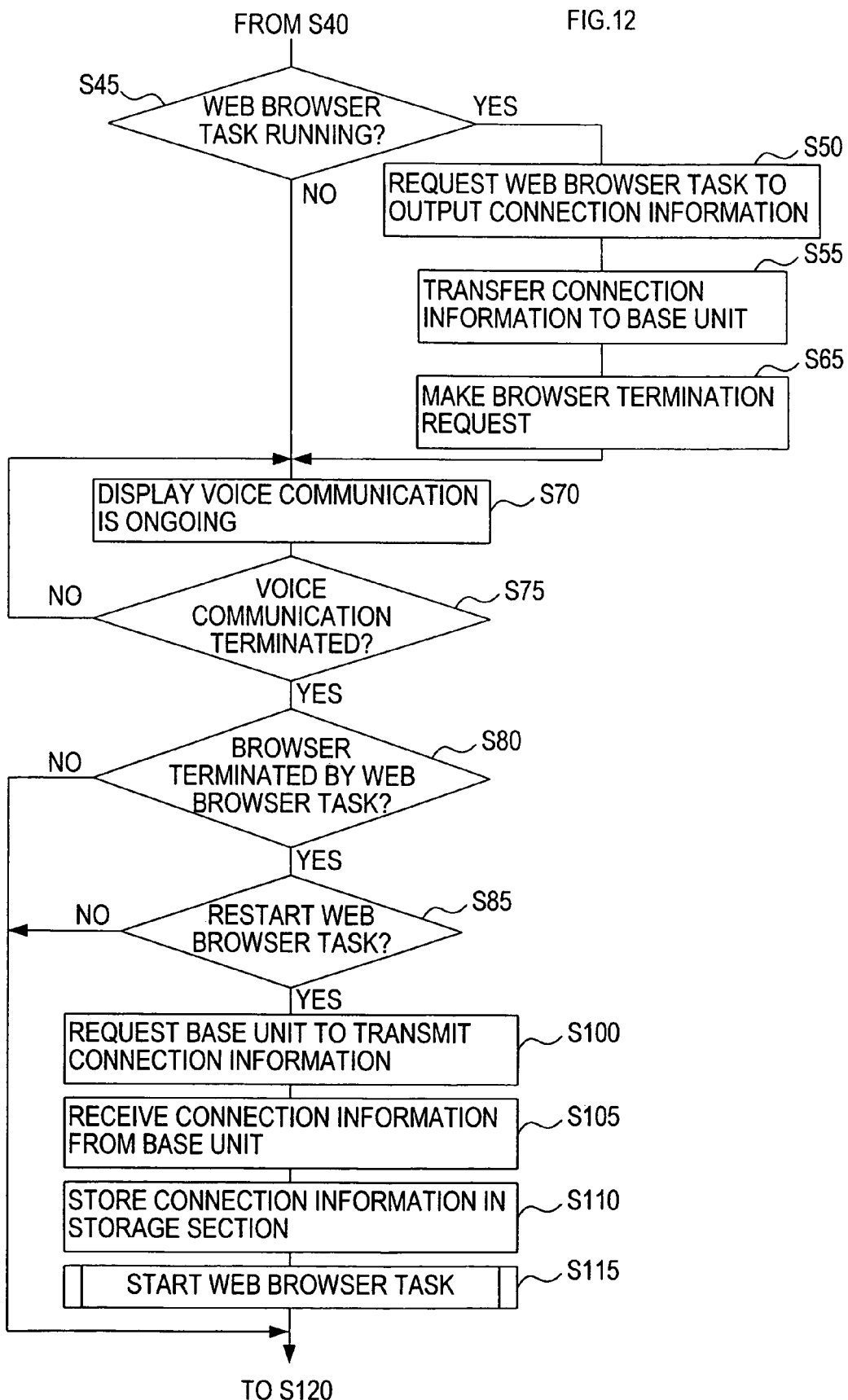
FIG. 12 is a flowchart showing a main task of a cordless handset in a second embodiment of the present invention.

FIG. 12 is a flowchart of a main task of the cordless handset 3 in the second embodiment showing only a part different from the first embodiment. The same reference numerals are applied to the same process steps as in the first embodiment.

In the present embodiment, as shown in FIG. 12, after the information before start of telephone call is transmitted to the base unit 2 (S55), the transmitted information before start of telephone call is not stored in the storage section 3B of the cordless handset 3, a request to terminate the currently running browser is made (S65), and the processing in S70 is executed.

When it is determined that the data communication is to be restarted by the cordless handset 3 (S85: YES), a request to transmit the connection information to the cordless handset 3 is made to the base unit 2 (S100) without making an inquiry to the base unit 2 as to whether or not the connection information has been updated. When the connection information is received (S105), the received connection information is stored in the storage section 3B (S110), and the Web browser task is started (S115).

Accordingly, when the information before start of telephone call is received as the connection information, the connection condition, when the voice communication is started, of the data communication which has been performed until immediately before the voice communication is started is restored, while when the information after termination of telephone call is received as the connection information, the data communication performed by the base unit 2 is restored.

2. Main Task of Base Unit

Figure 13:
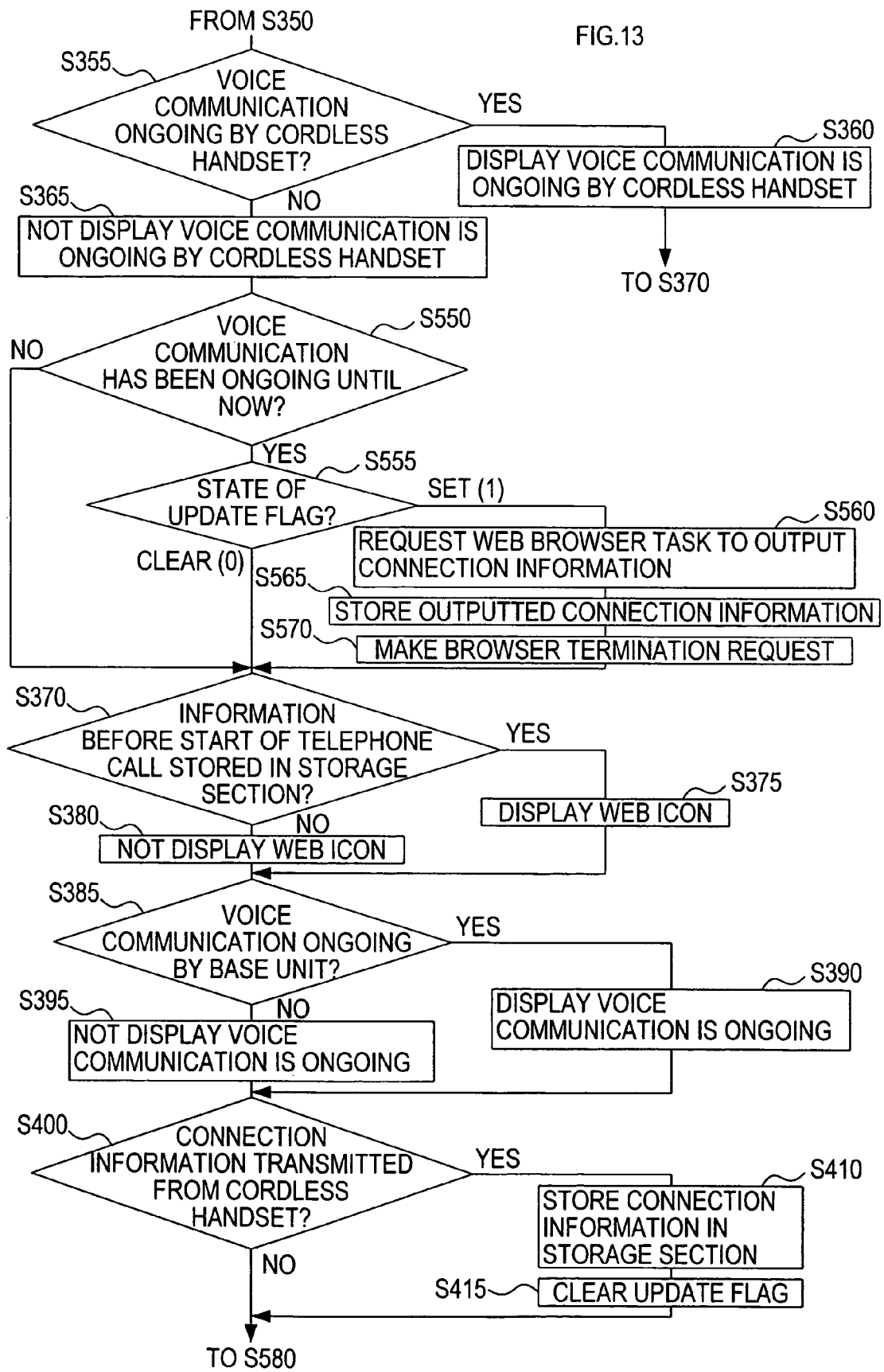
FIG. 13 is a flowchart showing a first part of a main task of a base unit in the second embodiment of the present invention.

FIGS. 13 and 14 are flowcharts of a main task of the base unit 2 in the present embodiment showing only a part different from the first embodiment. The same reference numerals are applied to the same process steps as in the first embodiment.

In the present embodiment, as shown in FIG. 13, when it is determined that a voice communication is ongoing by the cordless handset 3 (S355: YES), an indication that a voice communication is ongoing by the cordless handset 3 is displayed, and then the processing in S370 is executed. On the other hand, when it is determined that a voice communication is not ongoing by the cordless handset 3 (S355: NO), an indication that a voice communication is ongoing by the cordless handset 3 is not displayed (S365), and then it is determined whether or not a voice communication has been ongoing until it is determined that a voice communication is not ongoing in S355 (S550).

When it is determined that a voice communication has not been ongoing until then (S550: NO), the proceeding in S370 is executed, while when it is determined that a voice communication has been ongoing until then (S550: YES), a state of the update flag is determined (S555).

When it is determined that the update flag is not set (S555: Clear (0)), the proceeding in S370 is executed, while when it is determined that the update flag is set (S555: Set (1)), a request to output the connection information is made to the Web browser task (S560).

Subsequently, the connection information outputted in S560, that is, the current connection information of the browser indicating the connection condition immediately before the browser is terminated (the information after termination of telephone call) is stored in the information storage area (S565), and a browser termination request is made (S570).

The information before start of telephone call and the information after termination of telephone call are stored in the information storage area, and also it is determined in the proceeding in S370 executed after S565 whether or not the information before start of telephone call is stored. Accordingly, in S565, the connection information is stored such that it is distinguishable which connection information is stored in the information storage area.

When it is determined that the information before start of telephone call is not transmitted from the cordless handset 3 (S400: NO), or after the update flag is cleared (S415), as shown in FIG. 14, it is determined whether or not a request to output the connection information is received from the cordless handset 3 (S580) without determining whether or not an inquiry on whether or not the connection information is updated has been made, unlike the case of the first embodiment.

When it is determined that a request to output the connection information is received (S580: YES), the connection information, which is stored in the information storage area, is transmitted to the cordless handset 3, and the connection information is deleted from the information storage area.

Specifically, a state of the update flag is determined in S585. When it is determined that the update flag is set (S585: Set (1)), that is, when it is determined in S315 that a start request has been made by the Web icon and the update flag is set, the information after termination of telephone call stored in the information storage area in S565 (i.e., the connection information updated by the base unit 2) is transmitted to the cordless handset 3 and the connection information stored in the information storage area is deleted (S595), and then the processing in S460 is executed. On the other hand, when it is determined in S585 that the update flag is cleared (S585: Clear (0)), the information before start of telephone call stored in S410 (i.e., the connection information transferred from the cordless handset 3) is transmitted to the cordless handset 3 and the connection information stored in the information storage area is deleted (S590), and then the processing in S460 is executed.

3. Features of Communication Apparatus in Present Embodiment

In the present embodiment, when it is determined that the data communication has not been continued by the base unit 2, that is, it is determined that the information before start of telephone call and the information after termination of telephone call are identical, the information before start of telephone call is transmitted to the cordless handset 3. On the other hand, when it is determined that the data communication has been continued by the base unit 2 and the connection information is updated, that is, it is determined that the information before start of telephone call and the information after termination of telephone call are not identical, the information after termination of telephone call is transmitted to the cordless handset 3.

Accordingly, it is possible to restore, after the voice communication by the cordless handset 3 is terminated, the connection condition when the voice communication is started by the cordless handset 3 (based on the information before start of telephone call). It is also possible, even in a case where the data communication is performed by the base unit 2 and the connection information is updated while the voice communication is performed by the cordless handset 3, to restart the data communication from an updated connection condition (based on the information after termination of telephone call) by the cordless handset 3.

[Other Embodiments]

Although, in the above embodiments, the connection information is transmitted from the base unit 2 to the cordless handset 3 only when a request to transmit the connection information is received from the cordless handset 3, the present invention should not be limited to the embodiments. For example, the connection information may be transmitted when the voice communication by the cordless handset 3 is terminated, regardless of whether or not a request to transmit the connection information is received from the cordless handset 3. In this case, it may be possible that the base unit 2 transmits both types of connection information, i.e., the information before start of telephone call and the information after termination of telephone call, to the cordless handset 3, and the cordless handset 3 determines which connection information is to be used to restore the data communication.

Also, in the above embodiments, the communication apparatus determines which connection information, out of the information before start of telephone call and the information after termination of telephone call, is to be used to restore the data communication. However, the present invention should not be limited to the embodiments, but may be configured such that it is determined which connection information is to be used to restore the data communication in accordance with the user's instruction.

Further, in the above embodiments, the present invention has been described taking an example of a case where the data communication is performed by the cordless handset 3. However, the present invention should not be limited to the embodiments, but may be configured such that when an incoming call signal is detected while the data communication is performed by the base unit 2, the connection information is transmitted to the cordless handset 3.

Although, in the above embodiments, it is determined whether or not the information before start of telephone call and the information after termination of telephone call are identical based on the state of the update flag, the present invention should not be limited to the embodiments. For example, determination may be made based on presence or absence of a key operation to operate the browser by the base unit 2 or a user's instruction (input) or the like indicating that the connection information has been updated by the base unit 2.

Moreover, in the above embodiments, when a start request by the Web icon is made and also the Web browser task is running in the base unit 2, the browser in the base unit 2 is terminated in S325 in the base unit main task as shown in FIG. 8. However, it may be possible to configure such that a plurality of browser tasks are concurrently performed by the base unit 2. In this case, it may be possible to configure such that the browser in the base unit 2 is not terminated and is kept in a standby state and start the data communication by another browser task based on the information before start of telephone call from the cordless handset 3.

Also, while start of data communication based on the information before start of telephone call from the cordless handset 3 is triggered by a user's operation of the Web icon in the above embodiments, the present invention should not be limited to the embodiments. For example, it may be possible to configure such that when downloading of data is being performed and thus the data communication should desirably be continued, downloading performed by the cordless handset 3 is automatically continued by the base unit 2 without a user's particular operation.

Further, while data communication and voice communication by the cordless handset 3 are performed through the communication section of the base unit 2 in the above embodiments, the present invention should not be limited to the embodiments. It may be possible to configure such that the cordless handset 3 includes an equivalent component to the communication section, and directly performs data communication and voice communication. In this case, even when a voice communication is started during a data communication in response to an incoming call, it is not required to terminate the data communication. However, once a telephone call is started by the cordless handset 3, the display section is located near the user's ear and also the user cannot see the operation section. Accordingly, it will be impossible to perform the voice communication and browsing of a homepage at the same time even using the cordless handset 3 capable of performing voice communication and data communication at the same time.

Consequently, it is advantageous to configure such that even the cordless handset 3 capable of directly performing data communication and voice communication transfers the information before start of telephone call in data communication to the base unit 2 to restore the data communication by the base unit 2.

Also, while one cordless handset 3 is provided in the communication apparatus 1 of the above embodiments, a plurality of cordless handsets 3 may be provided therein. In a case where a plurality of cordless handsets 3 are provided, it may be possible to transfer the information before start of telephone call of the data communication by one of the cordless handsets 3 to another one of the cordless handsets 3 so that the data communication may be restored by the another one.

Further, while the Web icon is displayed on the display section 2F when the information before start of telephone call is stored in the storage section 2E of the base unit 2 in the above embodiments, the Web icon may be displayed on the display section 3C of the cordless handset 3.

Moreover, it may be configured such that, when the information before start of telephone call is stored in the storage section 3B of the cordless handset 3, an icon indicating that such information is stored is displayed on the display section 3C of the cordless handset 3. Furthermore, it may be configured such that, when the information after termination of telephone call is stored in the storage section 2E of the base unit 2, an icon indicating that such information is stored is displayed on the display section 2F of the base unit 2 or on the display section 3C of the cordless handset 3.

The present invention should not be limited to the above described embodiments, but may be embodied in various forms within the scope of the invention as defined by the appended claims.

What is claimed is:

1. A communication apparatus capable of data communication and voice communication, comprising:
    at least two communication units that are mutually communicable;
    an incoming call detection device that is configured to detect presence or absence of an incoming call signal;
    a notification device that is configured to provide a user, when an incoming call signal is detected by the incoming call detection device, with a notification indicating the detection of the incoming call signal; and
    a first transfer device that is configured to transfer, when a voice communication is started by a first communication unit out of the at least two communication units after the notification by the notification device is provided, a first connection information indicating a connection condition, when the voice communication is started, of a data communication which has been performed by the first communication unit until the voice communication is started, to a second communication unit other than the first communication unit out of the at least two communication units,
    wherein the second communication unit is configured to restore the connection condition by the first communication unit and to start a data communication based on the first connection information transferred by the first transfer device,
    wherein the second communication unit is configured to transfer a second connection information, which indicates a connection condition when the voice communication by the first communication unit is terminated or immediately before the data communication by the second communication unit is terminated, of a data communication which has been performed by the second communication unit, to the first communication unit, and
    wherein the first communication unit is configured to restore the connection condition by the second communication unit and to start a data communication based on the second connection information transferred by the second communication unit.

2. The communication apparatus according to claim 1, wherein:
    the first communication unit comprises a first display device that is configured to display information, and
    the notification by the notification device is displayed on the first display device as well as contents by the data communication.

3. The communication apparatus according to claim 1, wherein the second communication unit starts a data communication based on the first connection information transferred by the first transfer device when an instruction is provided from the user.

4. The communication apparatus according to claim 1, wherein:
    the first communication unit comprises:
        a first storage device that is configured to store the first connection information; and
        a first communication restoration device that is capable of restarting the data communication by the first communication unit based on the first connection information stored in the first storage device, and
    in addition to transferring the first connection information to the second communication unit, the first transfer device is configured to store the first connection information to the first storage device when the voice communication is started by the first communication unit after the notification by the notification device is provided.

5. The communication apparatus according to claim 4, further comprising:
    a first determination device that is configured to determine whether or not the first connection information stored in the first storage device and the second connection information are identical,
    wherein the first communication restoration device is capable of restarting the data communication by the first communication unit based on the first connection information stored in the first storage device when it is determined by the first determination device that the first connection information and the second connection information are identical.

6. The communication apparatus according to claim 5, further comprising:
    a second transfer device that is configured to transfer the second connection information to the first communication unit when it is determined by the first determination device that the first connection information and the second connection information are not identical.

7. The communication apparatus according to claim 5, wherein the second connection information indicates a connection condition, when the voice communication by the first communication unit is terminated, of a data communication which has been performed by the second communication unit.

8. The communication apparatus according to claim 6, wherein the second transfer device operates when an instruction is provided from the user.

9. The communication apparatus according to claim 5, wherein the first determination device determines whether or not the first connection information and the second connection information are identical when the voice communication by the first communication unit is terminated.

10. The communication apparatus according to claim 1, further comprising:

a second determination device that is configured to determine whether or not the first connection information and the second connection information are identical; and a second transfer device that is configured to transfer back the first connection information to the first communication unit when it is determined by the second determination device that the first connection information and the second connection information are identical, and is configured to transfer the second connection information to the first communication unit when it is determined by the second determination device that the first connection information and the second connection information are not identical.

11. The communication apparatus according to claim 10, wherein the second connection information indicates a connection condition, when the voice communication by the first communication unit is terminated, of a data communication which has been performed by the second communication unit.

12. The communication apparatus according to claim 1, wherein the first communication unit is capable of performing data communication and voice communication through the second communication unit.

13. The communication apparatus according to claim 1, further comprising:
a display control device that is configured to display, when the first connection information is stored, a symbol indicating that the first connection information is stored.

14. The communication apparatus according to claim 13, further comprising:
a communication restart device that is configured to restore the connection condition by the first communication unit based on the stored first connection information and restarts a data communication when the symbol is selected by the user.

15. The communication apparatus according to claim 13, wherein:
the second communication unit comprises:
a second storage device that is configured to store the first connection information; and
a second display device that is configured to display information, and
the display control device displays the symbol on the second display device when the first connection information is stored in the second storage device.

16. The communication apparatus according to claim 14, wherein:
the second communication unit comprises:
a second storage device that is configured to store the first connection information; and
a second display device that is configured to display information,
the display control device displays the symbol on the second display device when the first connection information is stored in the second storage device, and
when the symbol is selected by the user, the communication restart device restores the connection condition by the first communication unit in the second communication unit based on the first connection information stored in the second storage device, and restarts a data communication.

17. The communication apparatus according to claim 1, wherein the first and second connection information comprise at least one of contents displayed by each of the communication units and a URL indicating a location of the contents displayed by each of the communication units.

18. The communication apparatus according to claim 17, wherein the first and second connection information further comprise information for maintaining information among a plurality of pages.

* * * * *